May 23, 1950     R. B. MARYE     2,508,412
METHOD OF AND APPARATUS FOR CHECKING
FREQUENCY CHARACTERISTICS

Filed March 29, 1945     2 Sheets-Sheet 1

INVENTOR
ROBERT B. MARYE
BY
ATTORNEY

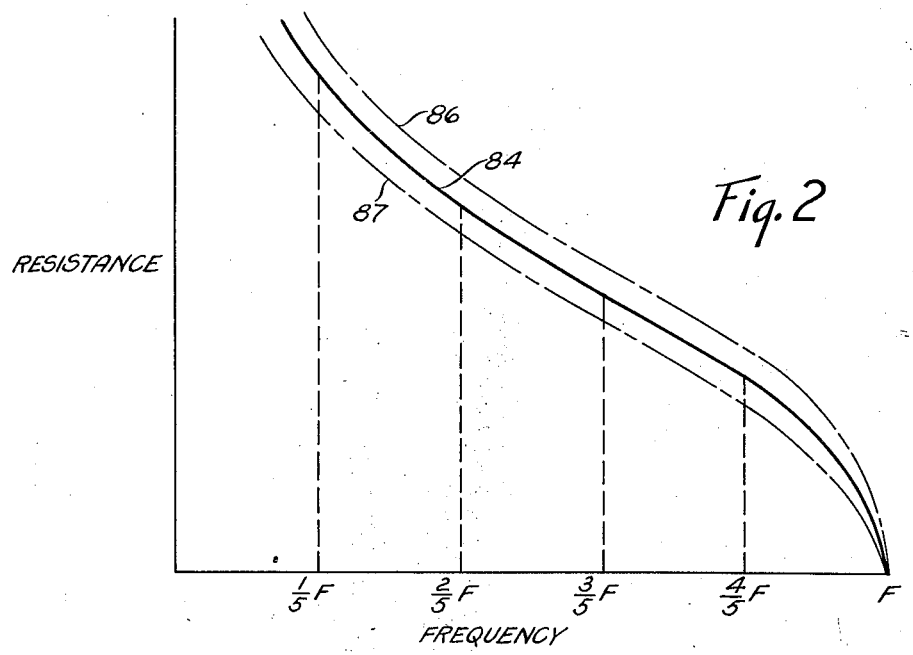
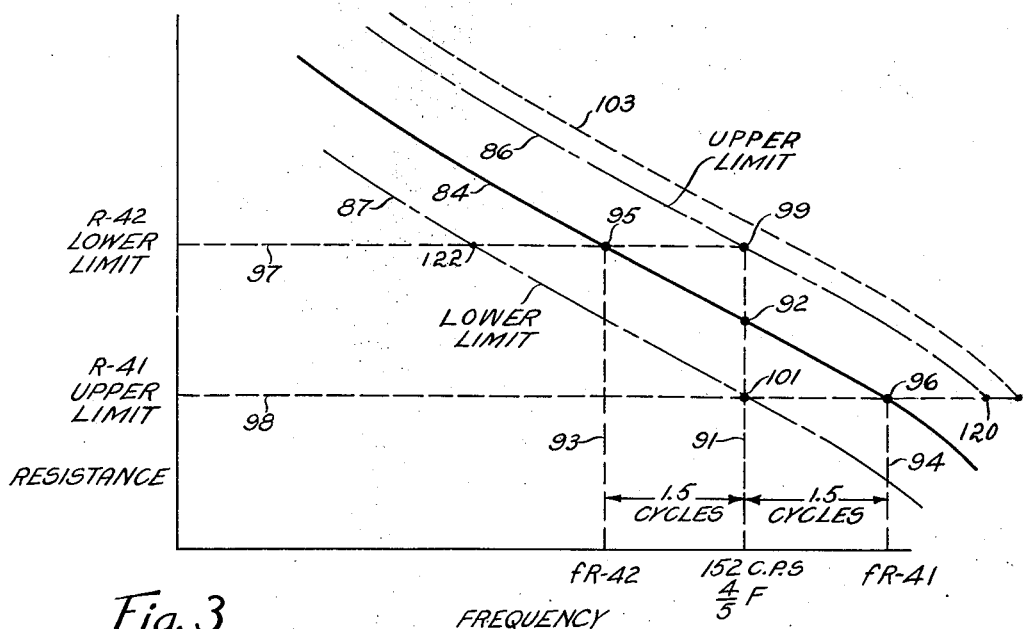

Patented May 23, 1950

2,508,412

UNITED STATES PATENT OFFICE 2,508,412

METHOD OF AND APPARATUS FOR CHECKING FREQUENCY CHARACTERISTICS

Robert B. Marye, Towson, Md., assignor to Bendix Aviation Corporation, South Bend, Ind., a corporation of Delaware Application March 29, 1945, Serial No. 585,502

8 Claims. (Cl. 175—183)

The present invention relates to methods of and apparatus for making frequency determinations, and more particularly to methods and apparatus for determining whether or not the impedance-frequency conversion characteristics of electric wave generating circuits or apparatus lie within a predetermined tolerance range.

In the transmission of information relative to conditions existing at an observation point, freedom from transmission errors is insured by translating the magnitude of the condition under observation into frequency variations of electric wave energy before sending the information on to the central data collecting point. This is because the frequency of an electric stimulus is the one invariant characteristic remaining unaltered by transmission vagaries. Atmospheric sounding apparatus employing radio transmission for the telemetering of the various indications to the ground observatory is constructed in accordance with this principle. In this application, when temperature and humidity indications are to be transmitted to the ground, they are first converted into resistance changes by resistors responding respectively to temperature and humidity. These resistors are connected into the grid circuit of a blocking oscillator whose repetition rate is determined by the grid circuit time constant or RC product. The blocking or repetition rate is thus controlled by the resistance in the grid circuit and this resistance is a function of the ambient condition under observation, whence the frequency, after proper conversion, is an index of the prevailing condition.

In efficiently producing such equipment on a large scale, the condition responsive resistors and blocking oscillator assemblies are separately fabricated and tested, and it is necessary that any resistor in cooperation with any blocking oscillator assembly deliver a frequency related in a predetermined manner to the measured condition, within a prescribed tolerance fixed by the required degree of accuracy. The resistors are tested, in the case of the temperature responsive resistors, by comparing observed value of resistance at different temperatures with a standard temperature-resistance curve or characteristic. Those deviating by more than a specified tolerance from the normal curve or characteristic are rejected. Such work is performed on a preset limit bridge.

In testing the resistance-frequency conversion characteristic of the blocking oscillator, a more complicated problem is encountered. There exists for frequency measurement no sufficiently sensitive equivalent to the resistance limit bridge. Therefore, current practice is to compare the frequency of the oscillator output with the frequency of a calibrated adjustable oscillator for a number of specified grid circuit resistance values, reading the frequency from the calibrated frequency control of the comparison oscillator whenever zero beat occurs. This requires careful manual adjustment of the comparison oscillator for each reading and the necessary precision can scarcely be expected of the average operator at the end of a long and arduous day. Further, when extreme precision is required backlash in the tuning drive mechanism of the comparison oscillator may seriously vitiate the accuracy of the observations, already somewhat limited by the extreme fineness of the graduations.

I have found that by employing a wave pattern visualizing device, such as a cathode ray oscilloscope having a synchronizable sweep oscillator, and impressing upon the oscilloscope the periodic energy of both the output from the wave generating circuit under test and the output of a comparison source, and varying the frequency of one of the energy outputs with respect to the other, through a span-defining a predetermined tolerance range, and observing the direction of pattern drift on the oscilloscope screen, novel methods of and apparatus for checking frequency characteristics are achieved, which provide accurate frequency checking, without the necessity of resorting to frequency meters or the like, and yet are of simple form and accomplish rapid checking, even in the hands of relatively unskilled workers. This may be carried out in several different ways, as will hereinafter be pointed out. In each instance however it is based upon the fact that deviation of a measured frequency from a comparison frequency by an amount greater than a predetermined limit can be detected by relatively altering the frequencies a number of cycles equal to the tolerance band width, whereupon any suitable form of wave pattern visualizing means, such as a cathode ray oscilloscope, jointly responsive to the two frequencies, will exhibit reversal of pattern drift when the frequency is within such limits, and such reversal of drift direction will not occur when the test frequency is not within the prescribed tolerance.

It is accordingly the major object of this invention to provide novel methods of and apparatus for checking the frequency of wave generating circuits whose output frequency varies with their impedance, in which the reversal or non-reversal of wave pattern drift on a wave pattern visualizing device directly indicates whether the wave generating circuit under test should be accepted or rejected respectively, thereby obviating the need of making meter readings or other measurements involving human skill.

Another important object is to provide novel method and apparatus for checking the output frequency of an impedance controlled wave generating circuit by means of a wave pattern visualizing means; a comparison frequency oscillator; and a plurality of tolerance couplets, the latter being applied to the circuit under test in such manner as to cause the fact of conformity of the circuit with the desired tolerance to be reflected as a reversal of drift of the wave pattern when the individual members of each couplet are alternately applied to the circuit.

A further object is to provide novel methods of and apparatus for checking frequency by means of a frequency source and an oscilloscope and selectively insertible frequency controlling impedances, in which the direction of resultant drift of the wave pattern in response to insertion of the impedances is utilized to determine whether or not the impedance-frequency conversion characteristics of the device being tested lie within certain limits.

A further important object is to provide a novel method for checking impedance-frequency conversion characteristics, in which a comparison frequency source and the output of the circuit under test are applied to a frequency comparing device of the type in which frequency differences are indicated by drift of the wave pattern, and pairs of impedances, hereinafter termed "tolerance couplets" having values corresponding to frequencies defining upper and lower frequency limits, are selectively inserted in the circuit whose conversion characteristic is being determined and the direction of drift of the resulting wave pattern is observed, to determine whether or not the circuit being tested possesses the desired frequency characteristics.

Another object is to provide novel methods of and apparatus for checking the impedance-frequency conversion characteristics of wave generating circuits in which pairs of tolerance couplets of frequency controlling impedances are selectively inserted in the circuit to simulate its range of normal operating resistance variation, and the direction of drift of the resulting wave pattern with respect to a constant frequency is observed to determine whether the frequency characteristics lie within certain limits, and the switches for inserting the couplets are so designed that the manual movement of the switch to insert a couplet corresponds to the direction of drift of the wave pattern indicative of frequency characteristics which lie within the desired range, whereby the operator need merely look for a drift opposite to the direction of switching, to determine whether the circuit under test should be rejected.

A further object is to provide novel methods and apparatus for testing circuits having a frequency-impedance curve of predetermined form, in which the frequency outputs of the circuit for various values of selectively inserted frequency controlling impedances are compared with the output of a comparison frequency source on a wave form visualizing device, the impedances being so selected that they cause the generation of frequencies normally centered on selected points distributed through the range of normal operating frequencies, for instance the central frequencies may correspond to frequencies approximately equal to several harmonics of the comparison frequency, but the individual frequencies define points on upper and lower tolerance limit curves lying either side of the standard curve, whereby the direction of drift of the wave pattern in response to insertion of the impedances directly indicates whether or not the characteristics of the circuit under test lie within the upper and lower tolerance limits.

Further objects will become apparent as the specification proceeds in conjunction with the annexed drawings, and from the appended claims.

In the drawings:

Figure 2 is a graph showing the "ideal" frequency-resistance characteristic of the circuit being tested, and also indicates the limit curves lying either side thereof; and Figure 3 is a view similar to Figure 2, but illustrates, on an enlarged scale, a fragment of the graph of that figure.

Figure 1:
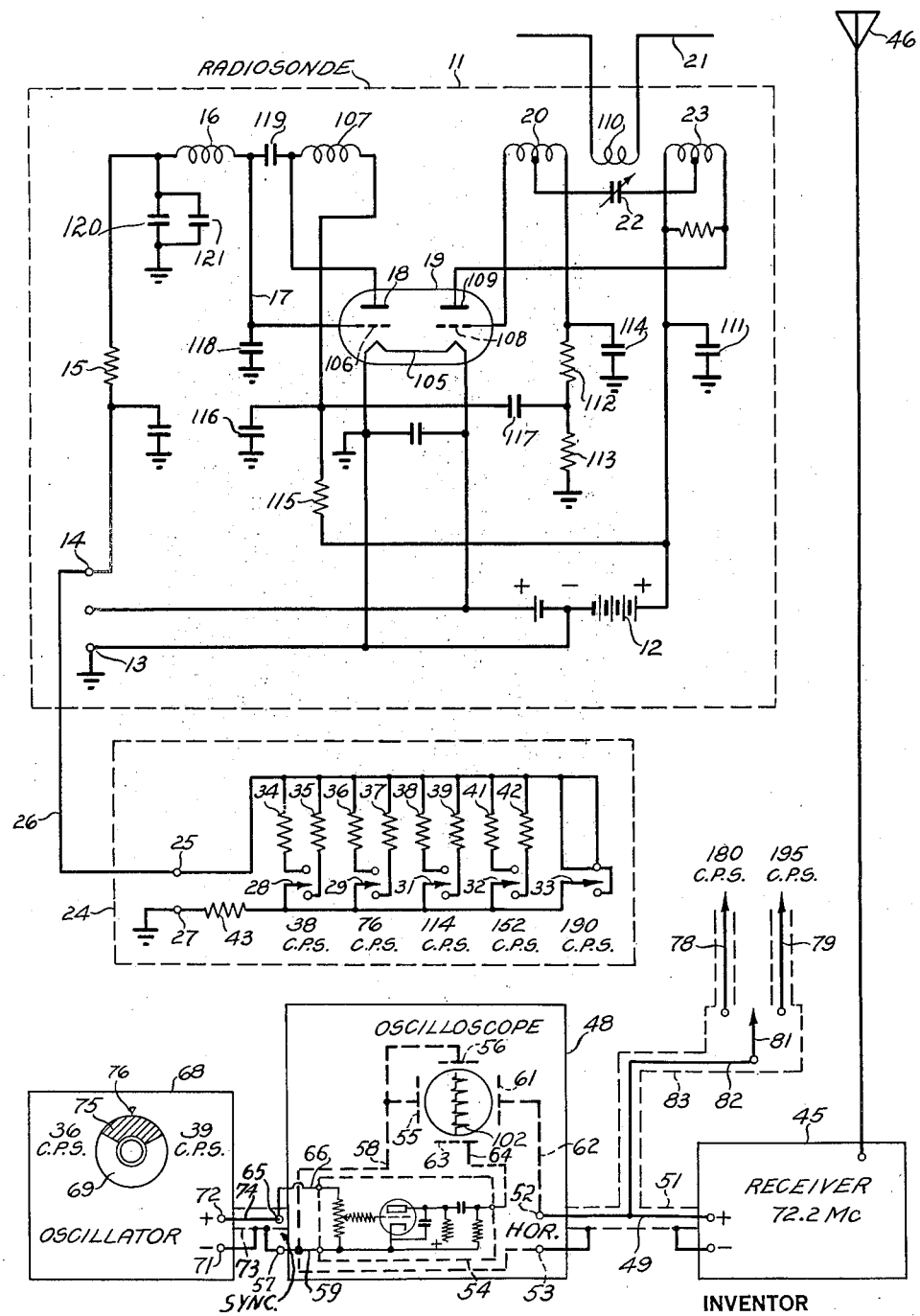
Figure 1 is a schematic view illustrating the novel apparatus for carrying out the method of the invention.

With continued reference to the drawings, in which like reference characters designate similar parts throughout the several views, the method and apparatus have been illustrated, by way of example in carrying out the invention, as being applied to a radio transmitter of the radiosonde type, which is designated generally by the reference character 11. Such equipment is adapted to be carried aloft with meteorological equipment by means of a free balloon, and periodically "broadcasts" temperature, humidity and pressure, the values of such measurements being represented by suitable modulation of the transmitted signal.

As illustrated, the radiosonde 11 includes a dual section vacuum tube with two independently operative sets of elements associated with a common filament 105. The control grid 106 and anode 18 are connected with the coils 16, 107 of a relaxation oscillation transformer while the control grid 108 and anode 109 connect with a radio frequency oscillation transformer 20, 23 having an output coupling loop 110 inserted between the split primary sections 20, 23. The energy picked up by the coupling loop 110 is impressed on the dipole antenna 21 for radiation to the observer location. The radio frequency oscillator circuit connected to grid 108 and anode 109 is of the conventional type in which anode and control grid circuits are coupled in positive feedback relationship to generate sustained oscillations. Anode voltage for anode 109 is secured by connection of the anode section 23 of the primary winding between anode 109 and the positive terminal of the source 12. A radio frequency bypass capacitor 111 is shunted from the positive terminal of source 12 to ground. The control grid 108 connects directly with the grid section 20 of the oscillation transformer primary and returns to ground through the series connected resistors 112 and 113. A radio frequency by-pass capacitor 114 is connected from the grid end of resistor 112 to ground and comprises a part of the tuning loop including capacitor 22 bridged between taps on primary sections 20 and 23 and by-pass capacitor 111. The radio frequency oscillation transformer or tank circuit is tuned to the desired signaling frequency by adjustment of capacitor 22. A frequency of 72.2 megacycles per second has been found to deliver satisfactory performance.

The configuration of the relaxation oscillator coupling circuits is quite similar, with the anode 18 coupled through primary 107 with the grid winding 16 and control grid 106 in positive feedback relationship. Anode supply voltage is obtained from the positive terminal of source 12 through a load resistor 115 and the anode winding 107. The anode end of resistor 115 is bypassed to ground for radio frequency energy by capacitor 116 and is coupled to the junction of resistors 112 and 113 in the grid circuit of the carrier frequency oscillator by capacitor 117. The control grid 106 of the relaxation frequency oscillator is shunted to ground through a tuning capacitor 118 which, together with anode-grid coupling capacitor 119, determines the auxiliary oscillation frequency of the relaxation or blocking oscillator. The grid current return path for blocking oscillator extends through winding 16 and resistor 15 to the terminal 14 normally connected with grounded terminal 13 through a measuring resistor. The circuits of anode 18 and control grid 106 are tightly coupled and they produce intermittent bursts of oscillation due to the fairly high time constant or RC product of resistor 15 and the grid capacitors 120, 121 connected between the low potential terminal of coil 16 and ground.

Because of the long grid circuit time constant, the blocking auxiliary electrodes 18, 106 generate oscillations in short bursts separated by long quiescent intervals. This is caused by the fact that intense oscillations occur at the oscillation frequency of the blocking oscillator determined by the constants of transformer 16, 107 and capacitors 118, 119, continuing until the capacitors 120, 121 have been sufficiently charged by the grid current to cut off the flow of anode current to the electrode 18. Oscillations then cease and do not recur until the voltage across capacitors 120, 121 has been diminished by leakage through resistor 15 and the external load connected to terminals 14 and 13 to an extent permitting the re-establishment of electron flow between filament 105 and anode 18 whereupon the entire sequence is cyclically repeated at a frequency, conveniently designated as the repetition rate, which is much lower than the oscillation frequency.

The anode 18 draws no current during the quiescent periods and current flows thereto only during the brief periods of auxiliary frequency generation. At each one of these periods of operation a negative pulse is developed across the anode resistor 115 and coupled to resistor 113 in the grid circuit of the radio frequency oscillator by coupling capacitor 117. Hence the signaling oscillations are periodically interrupted or modulated at the repetition frequency of the blocking oscillator. This repetition frequency is determined by the time constant of the circuit discharging capacitor 120, 121, which is in turn fixed by the magnitude of the resistance connected between terminals 13 and 14.

Accordingly, the blocking oscillator and radiosonde 11 afford a means for translating resistance variations into variations in the repetition rate of a blocking oscillator and the signaling oscillator is modulated at this repetition rate to transmit from the dipole antenna 21 a modulated carrier signal which may be intercepted, detected and utilized in suitable receiving apparatus.

In practice, a resistance which is a function of temperature is connected between the terminals 13 and 14 and the signal received in the ground receiver is detected, amplified and applied to a frequency meter. By knowing the relationship between resistance and frequency and between temperature and resistance, it is possible to evaluate the frequency meter readings in terms of temperature. The method of testing the resistance temperature characteristic of the temperature responsive resistor has already been outlined. Accuracy in the telemetering process further requires production control of the resistance-frequency conversion characteristic of the blocking oscillator. The problem of testing this characteristic to hold it within a specified maximum deviation from a predetermined standard relationship is somewhat complicated by the method of observation employed, which renders the shape of the conversion characteristic of major importance while the absolute frequencies are of relatively lesser importance. This is because the ground station frequency meter is provided with a shunt adjusted, when terminals 13 and 14 are connected through a selected reference value of resistance, to make the meter read full scale and so the determinations of the shape of the characteristic curve must be based upon percentage of this frequency rather than the absolute frequency existing at each of the check points. The frequency so obtained is secured intermittently during a series of observations by an arrangement periodically disconnecting the measuring resistor from terminals 13 and 14 and substituting a standard value of resistance as a reference permitting periodic resetting of the meter shunt. Therefore, the frequency delivered under these conditions is termed the reference frequency. The reference frequency is selected to be higher than any measuring frequency to be expected. Testing of the blocking oscillator unit over the working portion of the conversion characteristic requires the successive insertion of a number of resistance values situated within the normally anticipated range of values to be connected between terminals 13 and 14.

In order to introduce these resistances into the circuit a resistance unit 24 is provided, having a terminal 25 to which terminal 14 of the transmitter is connected by a lead 26. The unit 24 also has a grounded terminal 27 linked through ground with terminal 13.

The unit 24 embodies a parallel switching arrangement having double throw switches 28, 29, 31, 32, and 33 which may be operated to place pairs of resistors 34 and 35; 36 and 37; 38 and 39; and 41 and 42 alternately across terminal 14 and grounded terminal 27, it being observed that a fixed resistor 43 remains in the circuit irrespective of which direction the switches are thrown. For the sake of convenience, the pairs of resistors 34 and 35, 36 and 37, 38 and 39, and 41 and 42 are hereinafter referred to as "tolerance couplets." Switch 33 will place resistance 43 across terminal 14 and the ground in either position and is a double-throw switch merely for the sake of convenience.

The frequency developed in the blocking oscillator circuit will depend upon which of the resistances is connected to terminal 14, and correspondingly modulates the radio frequency oscillator in the radiosonde 11. The signal radiated from antenna 21 is intercepted by receiving antenna 26 which is connected with a radio receiver 45 tuned to 72.2 megacycles per second, the output frequency of the signaling oscillator in the radiosonde.

The signal picked up by the receiver 45 is amplified, detected and delivered from the receiver output terminals to an oscilloscope 48 by means of conductors 49 and 51, comprising a shielded line with a central conductor 49 and a shielding sheath 51. I have shown a cathode ray oscilloscope, but any suitable type of wave pattern visualizing device may be used. Conductor 49 and sheath 51 are connected to oscilloscope terminals 52 and 53 respectively, the latter being connected to the shielding sheaths and common circuit legs including terminal 57. The horizontal deflection plates 55, 61 of a conventional cathode-ray tube are connected respectively with the common terminal 53 and the measuring input terminal 52, while the vertical deflection plates 56, 63 are connected respectively with the circuit common and the output lead of a sweep oscillator 54. Sweep oscillator 54 is of the conventional type having a gas discharge tube connected in shunt with a capacitor constantly charged through a resistor, and generates a saw-tooth shaped voltage wave. The operation of the sweep oscillator 54 is controlled by, or synchronized with, the voltage impressed between terminals 57 and 65 by a comparison frequency oscillator 68 through the shielded line 73, 74 with the external sheath 73 connected with the common terminal 57, and the central conductor 74 connected with synchronizing input terminal 65.

The comparison local oscillator 68 has a rotatable frequency-varying dial 69, which may be operated to adjust the frequency in well known manner, and has terminals 71 and 72 which are connected to sweep circuit synchronizing terminals 57 and 65 by sheath 73 and inner conductor 74 respectively.

When the frequency of the saw-tooth voltage wave delivered by the sweep oscillator 54 to the vertical deflection plates 56, 63 is equal to or an integral sub-multiple of the frequency of the voltages applied to the horizontal deflection plates 55, 61, the successive images traced out on the screen 102 of the cathode-ray tube superimpose directly one upon the other and a stationary pattern is seen, imaging one, two, three or four cycles of the voltage wave on the horizontal deflection electrodes depending upon whether the sweep voltage frequency is equal to, or is the second, third or fourth sub-harmonic of the horizontal deflection electrode voltage. If these integral relationships do not exist, the successively laid down patterns do not precisely superimpose, but each is displaced a small amount from its predecessor, causing the patterns to drift slowly across the screen at a rate dependent upon the magnitude of the difference between the observed frequency and an integral relationship and in a direction dependent upon the sign of the difference.

In the embodiment of the invention illustrated, it is desired to limit the local oscillator adjustment to a range of from 36 to 39 cycles per second, as this is the predetermined tolerance range of the fifth sub-harmonic of the high end or reference frequency of the blocking oscillator measured with resistor 43 bridging terminals 13 and 14. It is accordingly provided with a shaded or colored sector 75, coacting with a pointer 76, so that it may be readily determined when the oscillator is set for frequencies above or below the range of 36 to 39 cycles, which limits have been illustrated as applied to the housing. When so connected, the dial 69 of the oscillator 68 is adjusted for zero drift of the pattern on the oscilloscope screen with switch 81 connected to the 180 cycle source to calibrate the 36 C. P. S. point, and then adjusted for zero drift of the pattern on the oscilloscope screen with switch 81 connected to the 195 cycle source to calibrate the 39 C. P. S. point.

Any suitable device may be provided for periodically checking the dial calibration of the local oscillator 68, as, for instance, a tone wheel unit having output lines 78 and 79 of 180 and 195 cycles per second respectively, the fifth harmonic of 36 and 39 cycles. These units may be selectively connected to the oscilloscope by means of a switch 81 and conductors 82 and 83, the latter being shown for convenience as connected to the receiver output shielding sheath 51.

Referring now to Figure 2, I have shown the resistance-frequency conversion characteristic of a typical radiosonde unit as a curve 84, with frequency plotted on the abscissa scale against resistance on the ordinate scale. Curve 84 is the "ideal" or desired frequency characteristic, and curves 87 and 86, shown in phantom lines, are tolerance curves shown as being spaced exaggerated distances from curve 84. They graphically represent the departure from the desired frequency curve which may be made and still have the unit comply with production specifications or "tolerances."

Also illustrated is the reference frequency F (the fifth harmonic of the comparison frequency) and frequencies corresponding to the first, second, third, and fourth harmonics of the comparison frequency. The latter may range from 36 to 39 cycles per second, depending upon the reference frequency found. Assuming, for example, that the reference frequency is found to be 190 cycles per second the comparison frequency will be 38 cycles per second with harmonics at 76, 114 and 152 cycles per second. It is to be understood that these values have been indicated in Figure 1 as applied to the selective resistor unit merely by way of illustration of the unit under test, which happens to possess a reference frequency of 190 cycles per second.

The manner in which the novel method of the invention is carried out is as follows.

I have found that by "locking in" the sweep oscillator at a comparison frequency of 38 cycles (the fifth sub-harmonic of the reference frequency of 190 cycles) with no external resistance in the grid circuit of the radiosonde, other than resistance 43, which remains constant throughout the test, and then selectively inserting the members of different pairs of resistors, which are hereinafter referred to as "tolerance couplets," in the grid circuit, the resistances of each pair being so selected as to cause the frequency to fall a predetermined distance either side of the nominal frequency corresponding to an intermediate value of blocking grid circuit resistance at the first, second, and third and fourth harmonic of the comparison frequency of 38 cycles, by an amount corresponding to the desired tolerance range, based on the theoretical curve, and observing the direction of drift of the resultant wave pattern in response to switching from one couplet to the other, it may be quickly and accurately determined whether the frequency characteristics of the unit under test lie within the tolerance range, without resort to reference tables or reading meters, and at the same time with extreme accuracy, while eliminating the errors due to the "human equation," which heretofore were inherent in measurements of this character. By spotting the nominal frequencies at the first, second, third and fourth harmonics of the comparison frequency, a series of such checks may be made without changing the setting of the comparison oscillator 68. Also, by coordinating the directions which the operator must throw the switches to insert the members of the several couplets in the circuit, with the direction the wave pattern should shift in response to the development of frequencies lying within the frequency range, it is practically impossible for the operator to incorrectly carry out the proper frequency checking method.

Specifically referring to the disclosure, the various units are placed in operation and switch 33 is closed, so as to place resistor 43 between transmitter terminal 14 and the ground. This resistor may have any suitable resistance equal to or less than the expected minimum value of measuring resistance, depending upon the application to which the radiosonde is being put. For instance, in the illustrated transmitter under test I have found that resistor 43 should have a resistance of 10,000 ohms.

With switch 33 closed as just described, the transmitter will transmit a radio frequency signal modulated at the reference frequency which is picked up by antenna 46 and transmitted by receiver 45 to the oscilloscope.

Knob 69 of the local oscillator is then rocked so as to cause its frequency output to exactly match the frequency output of the transmitter as determined by a stationary image of the wave pattern produced by the detected blocking oscillator modulation on the screen 102. In the event that knob 69 must be rocked to bring shaded area 75 beyond pointer 76 to satisfy this condition, the transmitter must be rejected because its reference frequency fails to lie within the prescribed limits of 180 to 195 cycles per second.

Assuming that the frequency of the transmitter does lie within the desired range, and that, for example, it is 190 cycles per second, the sweep oscillator is "locked in" at the comparison frequency of 38 cycles per second through the synchronizing action of the voltage at terminals 57 and 65 on the sweep oscillator 54 and switch 33 is then opened. This completes the testing and adjustment of the apparatus with the blocking oscillator delivering the reference frequency of 190 cycles per second.

The position of the conversion characteristic at a nominal frequency equal to four fifths of the reference frequency is next investigated. Where the reference frequency is 190 cycles per second as assumed for the unit, the object of the present discussion, this will correspond to a check point frequency of 152 cycles per second on the standard curve 84. A unit will be considered acceptable if the delivered frequency lies within plus or minus one and one-half cycles per second of the nominal value. The use of visual wave images for detecting deviations beyond this limit requires that either the comparison frequency oscillator 68 in control of the sweep oscillator 54, or the blocking oscillator under test, be shifted through this span of three cycles per second, which may be called the tolerance span. The illustrated system employs the shifting of the repetition rate or frequency of the blocking oscillator to achieve the desired effect. Resistor 41 is lower in value than the resistance required to generate the nominal frequency in a unit having a standard resistance-frequency conversion characteristic by an amount which produces a frequency one and one-half cycles per second high. Resistor 42 is higher in value than the resistance required to generate the nominal frequency in a unit having a standard resistance-frequency conversion characteristic by an amount which produces a frequency one and one-half cycles per second low.

In a blocking oscillator circuit having the standard resistance-frequency conversion characteristic, the repetition frequency with resistor 41 inserted lies one and one-half cycles per second above the fourth harmonic of the comparison frequency, while the repetition frequency with resistor 42 in the circuit lies one and one-half cycles per second below the fourth harmonic of the comparison frequency. As was developed earlier in the presentation, the existence of other than an integral relationship between the comparison wave energy and the observed wave energy causes the image laid down on the wave pattern visualizing device, to drift across the observing screen, and the sense of this drift depends upon whether the observed frequency is higher or lower than the integral value. In the case of the standard characteristic, therefore, a reversal of pattern drift is observed when resistors 41 and 42 are alternately inserted in the blocking oscillator circuit, the drift on screen 102 of Fig. 1 being upward when resistance 42 is in circuit and downward when resistance 41 is in circuit. The drift reversal signals that the blocking oscillator is within the test limits of curves 86 and 87.

Referring back to Figs. 1 and 3, whenever the blocking oscillator frequency lies to the left of the ordinate 91, corresponding to the fourth harmonic of the comparison frequency, the wave pattern on screen 102 drifts upward, and whenever the blocking oscillator frequency lies to the right of the ordinate 91, the pattern drifts downward. Fig. 3 portrays graphically the same material just presented in words.

Consider now the conditions prevailing when a blocking oscillator having the low limit resistance-frequency conversion characteristic 87 is connected with the test circuit and the apparatus is adjusted as above outlined. With the resistance 42 in the circuit, the frequency developed corresponds to the ordinate passing through the point 122, and is lower than the fourth harmonic of the comparison frequency, and the wave pattern will drift upward. Resistance 41 is now inserted in the circuit by the operator and the blocking oscillator assumes a frequency corresponding to the ordinate 91 passing through the point 101 marking the intersection of the curve and the line 98 indicating the value of resistor 41. The frequency corresponding to ordinate 91 is exactly equal to the fourth harmonic of the comparison frequency and hence a stationary wave pattern will be observed on the screen 102.

If a blocking oscillator having a still lower resistance-frequency characteristic is connected in the test circuit and the above operations repeated, the points 122 and 101 will both be displaced to the left, lower in the frequency spectrum, so that the frequency generated when either resistor 41 or resistor 42 is in the circuit is lower than and lies to the left of the value corresponding to the ordinate 91. Under these conditions, the wave pattern will drift upward in both cases, no reversal of drift direction occurring. This affords an unfailing and immediately observable index for acceptance or rejection of the tested unit.

Attention is now turned to the case of a blocking oscillator in which the resistance-frequency conversion characteristic is as shown by the upper limit curve 86. With such an oscillator connected into the test circuit, and resistance 42 switched into the grid circuit, a frequency corresponding to the ordinate passing through point 99 is generated. On Fig. 3, it is seen that this ordinate is coincident with ordinate 91, so that a stationary pattern is seen on the screen 102. Now switching resistor 41 into the circuit, a frequency corresponding to the ordinate passing through the point 120 is generated, lying far to the right of the ordinate 91. In this case, the wave pattern on screen 102 drifts downward on the screen. If the resistance-frequency conversion characteristic lies to the right of the upper limit curve 86, as is the case for the curve 103, both points 99 and 120 lie to the right of the ordinate 91 and no pattern reversal occurs, nor is the pattern stationary at one limit. This again affords an index for the acceptance or rejection of the unit under test.

The other points on the frequency curve are checked in a manner similar to that just described, namely, switches 31, 29 and 28 are successively pushed down and then up so as to place the remaining resistances, which also define the upper and lower frequency limits, at the selected points on the curve, their resistances being selected in the manner specifically discussed relative to resistances 41 and 42 and as illustrated in Figure 3, so that if the wave pattern successively drifts down and then up, in response successively pushing the switches down and then up the circuit under test is "within tolerance."

Because of their lever actuated construction, the motion of the switch contacts and the actuating handle are generally oppositely directed and, hence, handle motion and direction of drift in an acceptable unit are the same.

In carrying out the foregoing tests it is observed that the individual switches of each pair may be successively operated upwardly and downwardly before passing on to the next switch, or, if desired, each switch may be successively pushed up and then successively pushed down, since it is merely necessary to observe a single instance in which the wave pattern shifts in a direction contrary to the direction of shift of the switch, to constitute basis for rejecting the particular circuit under observation as being out of tolerance.

While I have shown and prefer to employ a switch and resistor assembly in which the resistances are so coordinated with the resistors that the manual movement of the switch corresponds in direction to the shift of the wave pattern in response to the testing of a portion of a frequency characteristic curve which lies within tolerance, in order to simplify matters and render it extremely easy for the operator to instantly detect a circuit which should be rejected, it is to be understood that the invention is not specifically limited to such switching arrangement, and that any other suitable arrangement may be employed. The main thing to observe is that the wave pattern appearing on the oscilloscope should change its direction of shift when each switch is moved from one position to the other, in order to indicate that the circuit under test falls within the tolerance range. In other words, if a unit is being tested and the direction of drift of the wave pattern does not change when the switch is moved from one position to another, it is immediately apparent that the frequency characteristic does not lie within the tolerance range.

From the foregoing disclosure it is apparent that the invention provides novel methods of and apparatus for checking the resistance-frequency conversion characteristics of electric wave generating circuits, and that by selectively inserting in the circuit different pairs of resistors, the resistances of each pair being so selected as to cause the frequency to fall a predetermined distance either side of the first, second, third, and fourth harmonic of the comparison frequency, by amounts corresponding to the desired frequency tolerance range, and observing the direction of drift of the resultant wave pattern in response to switching from one resistor to the other, it may be determined at a glance whether the frequency is in tolerance, avoiding all of the disadvantages of the prior methods, and yet achieving accurate checking of frequency characteristics. Also, by coordinating the direction of movement of each switch with its resistors, so that drift of the wave pattern occurs in the same direction as the switch movement for a circuit whose frequency characteristics are acceptable, it is practically impossible for the operator to incorrectly carry out the proper checking method.

It is to be understood that while I have shown the method of the invention as being applied to the checking of a radio transmitter circuit for frequency, it may be successfully employed to check the frequency delivered by any resistance controlled electric wave generating circuit, provided that the resistances are so selected, in accordance with the method described in connection with Figure 3, to set up the proper tolerance limits.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent is:

1. In frequency checking apparatus, a cathode ray oscilloscope having a screen for producing a wave pattern image thereon; means for impressing periodic energy from a comparison source upon said oscilloscope; means for impressing periodic energy from the source under test upon said oscilloscope; and switching means for alternatively relatively shifting the frequencies of said sources through a frequency interval defining a predetermined high limit for said source under test and through a frequency interval defining a predetermined low limit for said source under test.

2. In an apparatus for testing electrical equipment having a wave generating circuit whose output frequency varies with a frequency controlling impedance connected thereto; an oscilloscope having a screen for producing a wave pattern image thereon; means for impressing periodic energy from said circuit upon said oscilloscope; means for impressing periodic energy from a comparison source upon said oscilloscope, the said wave pattern image being stationary with respect to said screen when the respective output frequencies of the said circuit and said comparison source are integrally proportional and being movable with respect to said screen when the said respective output frequencies are not integrally proportional, the direction of motion of said image serving to indicate whether the output frequency of said circuit is greater than or less than a value of frequency integrally proportional to the output frequency of said comparison source; and means for shifting the frequency of said circuit through frequency ranges, so as to test various portions of the impedance-frequency conversion characteristic of said circuit, each of said frequency ranges extending through a predetermined range of frequency equal to the permissible deviation from tolerance either side of a fixed frequency, whereby the direction of motion of said wave pattern range indicates conformity or lack of comformity of said circuit to said tolerance.

3. In apparatus for measuring the impedance-frequency conversion characteristic of a wave generator whose output frequency is a function of the magnitude of a frequency controlling impedance connected between selected circuit points, the combination of a pair of conductive members adapted for connection to said selected circuit points, one of said conductive members including a control impedance in series therewith, switching means for connecting said conductive members together whereby said control impedance is connected across said circuit points, a plurality of impedance couplets having individual members selected to produce in a normal generator frequencies slightly above and slightly below selected nominal values, and switching means for selectively connecting the individual members of said couplets between said conductive members.

4. In apparatus for measuring the impedance-frequency conversion characteristic of a wave generator whose output frequency is a function of the magnitude of a frequency controlling impedance connected between selected circuit points, the combination of a pair of terminals adapted for connection with said selected circuit points, switching means for connecting a predetermined value of resistance between said terminals producing in said generator a reference frequency, a plurality of impedance couplets having individual members selected to produce in a normal generator frequencies slightly above and slightly below the harmonics of a selected subharmonic of said reference frequency, and switching means for selectively connecting the individual members of said couplets between said terminals.

5. In a device for testing the frequency characteristic of an electric wave generator having an output frequency which varies with the magnitude of a control impedance associated therewith, comprising a cathode ray oscilloscope, a local oscillator having an output frequency which varies in a predetermined sense, means for connecting the output of said generator to said oscilloscope, means for connecting the output of said local oscillator to said oscilloscope, whereby the output frequency of said local oscillator may be synchronized with the output frequency of said generator, said oscilloscope having a screen for producing a wave pattern image, the said image being stationary with respect to said screen when the respective output frequencies of said generator and said local oscillator are integrally proportional and being movable with respect to said screen when the respective frequencies of said generator and said oscillator are not integrally proportional, and means for selectively inserting tolerance couplets of impedance alternately in the frequency varying circuit of said generator, said couplets having such values of impedance that by observing the direction of motion of said image when the couplets are successively inserted, it may be readily determined whether or not the frequency characteristics of the said generator lie within a predetermined range.

6. The device defined in claim 5, wherein said tolerance couplets have a range of impedance substantially coextensive with the range of impedances employed when the said generator is in actual use, and one member of each couplet has an impedance of such value as to produce a frequency defining a lower frequency limit, and the other member of each couplet has a resistance of such value as to produce a frequency defining an upper frequency limit.

7. In a device for checking the impedance-frequency conversion characteristics of an electric wave generator delivering an output frequency varying with the magnitude of a control impedance associated therewith, comprising a cathode ray oscilloscope having a screen for producing a wave pattern image, a local oscillator having an output frequency which varies in a predetermined sense, means for connecting the output of said generator to said oscilloscope, means for connecting the output of said local oscillator to said oscilloscope whereby the output frequency of said local oscillator may be synchronized with the output frequency of said generator, the image produced on the screen of the said oscilloscope being stationary with respect to said screen when the respective output frequencies of said generator and said local oscillator are integrally proportional and being movable with respect to said screen when the respective frequencies of said generator and said oscillator are not integrally proportional, means for adjusting the output frequency of said local oscillator to provide an output frequency integrally proportional to the output frequency of said generator, the image on said screen being stationary when the output frequency of the local oscillator is so adjusted, thereby serving to indicate a comparison frequency, means for varying the output frequency of said generator, said last-named means comprising a plurality of pairs of impedances adapted to be inserted into the frequency varying circuit of said generator, one impedance of each pair having such a value as to produce a frequency defining a lower frequency limit for a portion of said characteristic and the other impedance of each pair having such a value as to produce a frequency defining an upper frequency limit for the same portion of said characteristic, and switch means for selectively inserting said impedances individually in the frequency varying circuit of said generator whereby the direction of motion of the image exhibited by said oscilloscope will visually show whether or not the actual conversion characteristics of said circuit fall within said upper and lower frequency limits.

8. The device claimed in claim 7, wherein said switch means embody operating members which are manually movable in the same direction in which the image should move in response to switch closure to indicate that the particular portion of the frequency characteristic being tested lies within the upper or lower limit, as the case may be.

ROBERT B. MARYE.

REFERENCES CITED

The following references are of record in the file of this patent:

UNITED STATES PATENTS

| Number | Name | Date |
|---|---|---|
| 1,251,440 | Sultzer | Dec. 25, 1917 |
| 2,145,483 | Jacob | Jan. 31, 1939 |
| 2,153,313 | Bagno et al. | Mar. 21, 1939 |
| 2,189,457 | Archer | Feb. 6, 1940 |
| 2,243,234 | Von Duhn | May 27, 1941 |
| 2,286,029 | Van Beuren | June 9, 1942 |